United States Patent
Tadas

(10) Patent No.: US 12,227,168 B2
(45) Date of Patent: Feb. 18, 2025

(54) ACCURATE ERROR ESTIMATION IN E-MOTOR SENSORS

(71) Applicant: SENSATA TECHNOLOGIES, INC., Attleboro, MA (US)

(72) Inventor: Harshad V. Tadas, Franklin, MA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 366 days.

(21) Appl. No.: 17/694,894

(22) Filed: Mar. 15, 2022

(65) Prior Publication Data

US 2022/0314963 A1    Oct. 6, 2022

Related U.S. Application Data

(60) Provisional application No. 63/169,108, filed on Mar. 31, 2021.

(51) Int. Cl.
| | | |
|---|---|---|
| *B60W 20/40* | (2016.01) | |
| *B60W 50/08* | (2020.01) | |
| *B60W 50/12* | (2012.01) | |

(52) U.S. Cl.
CPC .......... *B60W 20/40* (2013.01); *B60W 50/082* (2013.01); *B60W 50/12* (2013.01); *B60W 2510/081* (2013.01)

(58) Field of Classification Search
CPC .... B60W 20/40; B60W 50/082; B60W 50/12; B60W 2510/081; G01D 3/022;
(Continued)

(56) References Cited

U.S. PATENT DOCUMENTS

| | | | |
|---|---|---|---|
| 10,260,908 B2 * | 4/2019 | Mayer | G01D 5/2457 |
| 2004/0094351 A1 | 5/2004 | Higashi et al. | |

(Continued)

FOREIGN PATENT DOCUMENTS

| | | | | |
|---|---|---|---|---|
| CN | 101192808 B | * | 9/2010 | H02K 1/145 |
| CN | 105531917 A | * | 4/2016 | H02P 6/185 |

(Continued)

OTHER PUBLICATIONS

JP-3740098-B2 translation (Year: 2006).*
(Continued)

*Primary Examiner* — Kyle T Johnson
(74) *Attorney, Agent, or Firm* — Mark H. Williams

(57) ABSTRACT

Methods, apparatus, systems, and computer program products for estimating error in an electric motor position sensor are disclosed. In a particular embodiment, an electronic control unit (ECU) for an electric motor receives, during a first state of operation of the electric motor, a first plurality of time samples of a first output signal from a position sensor, the first output signal indicative of a rotational position of the electric motor during the first state. The embodiment includes determining a first magnitude value for each of the first plurality of time samples of the first output signal, determining a first magnitude ripple value based upon the plurality of first magnitude values, and determining a first absolute angle error based on the first magnitude ripple value. The embodiment further includes determining an estimated error offset based on the first absolute angle error and storing the estimated error offset in a memory.

17 Claims, 10 Drawing Sheets

(58) Field of Classification Search
CPC .... G01D 5/2053; G01D 18/008; H02P 21/18; H02P 21/14
See application file for complete search history.

(56) References Cited

U.S. PATENT DOCUMENTS

| | | | | |
|---|---|---|---|---|
| 2004/0263114 | A1* | 12/2004 | Kaneko | H02P 21/18 318/811 |
| 2007/0043528 | A1* | 2/2007 | Bae | G01P 3/488 702/142 |
| 2008/0129243 | A1* | 6/2008 | Nashiki | H02K 3/28 318/701 |
| 2010/0045219 | A1* | 2/2010 | Ajima | H02P 6/10 318/400.38 |
| 2014/0246997 | A1* | 9/2014 | Suzuki | H02P 6/16 318/400.04 |
| 2018/0009434 | A1* | 1/2018 | Hayakawa | B60K 6/46 |
| 2018/0226906 | A1* | 8/2018 | Chen | H02P 6/183 |
| 2020/0116532 | A1 | 4/2020 | Janisch et al. | |
| 2021/0328532 | A1* | 10/2021 | Ikram Ul Haq | H02P 21/0025 |
| 2022/0314963 | A1* | 10/2022 | Tadas | B60W 20/40 |

FOREIGN PATENT DOCUMENTS

| | | | | |
|---|---|---|---|---|
| CN | 109067286 | A * | 12/2018 | H02P 21/18 |
| JP | 2003035566 | A | 2/2003 | |
| JP | 3740098 | B2 * | 1/2006 | H02P 21/14 |
| JP | 2018021913 | A | 2/2018 | |
| JP | 2020046376 | A | 3/2020 | |

OTHER PUBLICATIONS

CN-109067286-A translation (Year: 2018).*
CN-105531917-A translation (Year: 2016).*
CN-101192808-B translation (Year: 2010).*
Automated Test of ECU in Hardware in Loop Simulation (Year: 1999).*
Extended European Search Report, EP22164696.1, Jul. 25, 2022, 7 pages.

* cited by examiner

Electronic Control Unit (ECU) 200

Receive, During A First State Of Operation Of An Electric Motor, A First Plurality Of Time Samples Of A First Output Signal From A Position Sensor, The First Output Signal Indicative Of A Rotational Position Of The Electric Motor During The First State 802

↓

Determine A First Magnitude Value For Each Of The First Plurality Of Time Samples Of The First Output Signal 804

↓

Determine A First Magnitude Ripple Value Based Upon The Plurality Of First Magnitude Values 806

↓

Determine A First Absolute Angle Error Based On The First Magnitude Ripple Value 808

↓

Determine An Estimated Error Offset Based On The First Absolute Angle Error 810

↓

Store The Estimated Error Offset Based In A Memory 812

↓

Receive, During A Second State Of Operation Of The Electric Motor, A Second Plurality Of Time Samples Of A Second Output Signal From The Position Sensor, The Second Output Signal Indicative Of A Rotational Position Of The Electric Motor During The Second State 902

↓

Determine A Second Magnitude Value For Each Of The Second Plurality Of Time Samples Of The Second Output Signal 904

ACCURATE ERROR ESTIMATION IN E-MOTOR SENSORS

CROSS-REFERENCE TO RELATED APPLICATIONS

This application is a non-provisional application for patent entitled to a filing date and claiming the benefit of earlier-filed U.S. Provisional Patent Application Ser. No. 63/169,108, filed Mar. 31, 2021, the contents of which are herein incorporated by reference in their entirety.

BACKGROUND

Position sensors, such as inductive position sensors, are often used to provide feedback to control systems for electric motors (E-motors). Position sensors measure a rotational position of a portion of the E-motor, such as a rotor, with respect to the positional sensor. For synchronous motors, feedback from inductive position sensors are often required in order to calculate the phase currents necessary to obtain a desired torque from the synchronous motors and achieve maximum motor efficiency. E-motor position sensors are also often used as functional safety critical sensors. Accordingly, E-motor position sensors should be designed and implemented in such a manner that sensor error is within a given specification. If the sensor error increases beyond the given specification, due to causes such as component and/or system failure, the position sensor and/or system should take appropriate action. For example, the system may enter a safe mode in which operation is ceased or greatly reduced.

Existing methods of error estimation in E-motor sensors are often effective only under nominal mechanical tolerance conditions but are inaccurate under high target runout conditions such as when there is a significant radial and/or axial runout between target and sensor.

SUMMARY

Methods, apparatus, systems, and computer program products for estimating error in an electric motor position sensor are disclosed. In a particular embodiment, an electronic control unit (ECU) for an electric motor receives, during a first state of operation of the electric motor, a first plurality of time samples of a first output signal from a position sensor. In this particular embodiment, the first output signal is indicative of a rotational position of the electric motor during the first state. In this particular embodiment, the ECU determines a first magnitude value for each of the first plurality of time samples of the first output signal. In this particular embodiment, the ECU determines a first magnitude ripple value based upon the plurality of first magnitude values. In this particular embodiment, the ECU determines a first absolute angle error based on the first magnitude ripple value. In this particular embodiment, the ECU determines an estimated error offset based on the first absolute angle error. In this particular embodiment, the estimated error offset is stored in a memory associated with the ECU.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF DRAWINGS

FIGS. 9A-9B set forth a flowchart of an example method for estimating error in an electric motor position sensor in accordance with at least one embodiment of the present disclosure.

DESCRIPTION OF EMBODIMENTS

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
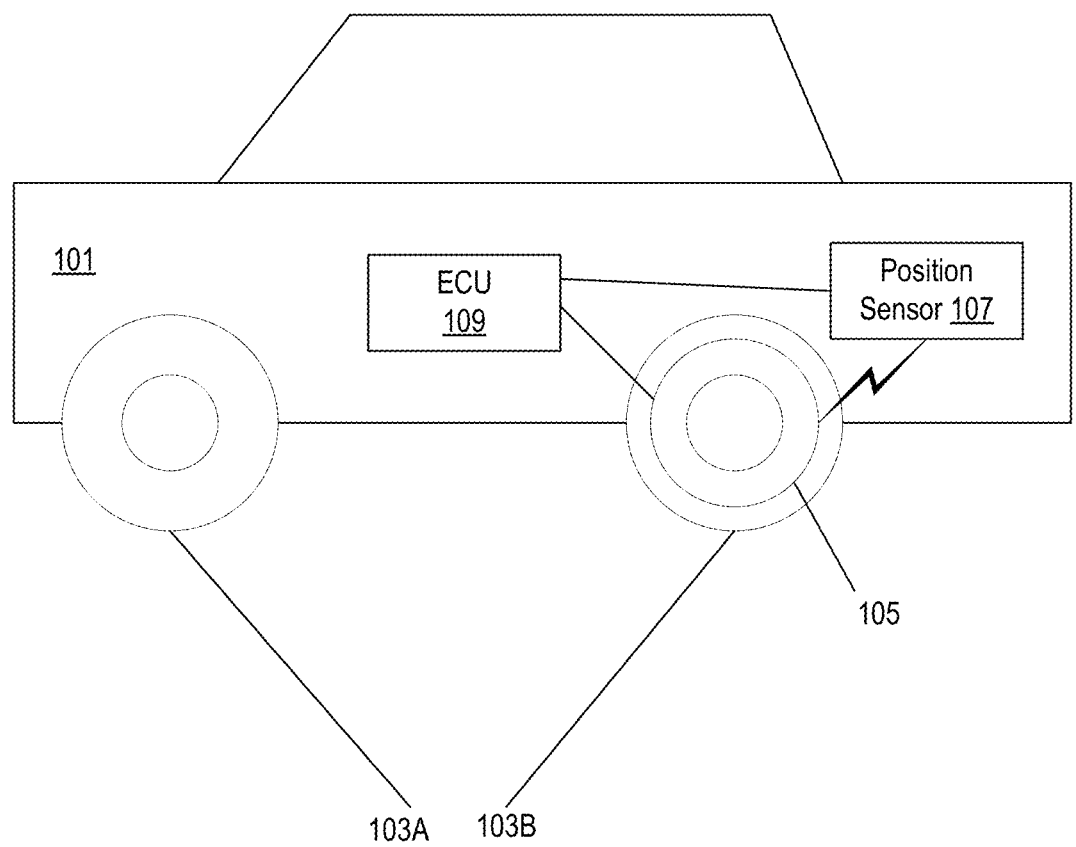
FIG. 1 sets forth a diagram of a system configured for error estimation in E-motor sensors in accordance with at least one embodiment of the present disclosure.

Exemplary methods, apparatuses, and computer program products for error estimation in E-motor sensors in accordance with the present disclosure are described with reference to the accompanying drawings, beginning with FIG. 1. FIG. 1 sets forth a diagram of a system (100) configured for error estimation in E-motor sensors in accordance with at least one embodiment of the present disclosure. The system (100) of FIG. 1 includes a vehicle (101) equipped with wheel assemblies (103A, 103B) that each include a hub and tire. In a particular embodiment, the vehicle (101) may include an automobile. The vehicle (101) further includes an electric motor (105) coupled to the wheel assembly (103B) and an associated position sensor (107). In a particular embodiment, the electric motor (105) may be coupled directly to the wheel assembly (103B). In another particular embodiment, the electric motor (105) may be coupled to the wheel assembly (103B) via a transmission or one or more gears.

The electric motor (105) is configured to provide motive power to the wheel assembly (103B) to propel the vehicle (101). In a particular embodiment, the electric motor (105) comprises a synchronous motor. The position sensor (107) is configured to determine a rotational position of a portion the electric motor (105), such a rotor, and provide an output signal representative of the rotational position. In a particular embodiment, the position sensor (107) is an inductive position sensor. While the embodiment of FIG. 1 shows a single wheel assembly (103B) coupled to the electric motor (105) and having an associated positional sensor (107), it will be understood that two or more of the wheel assemblies of the vehicle (101) may each be coupled to an electric motor, and each electric motor may have one or more position sensors associated therewith. In addition, while the embodiment of FIG. 1 shows a single position sensor (107) associated with the electric motor (105), it will be understood that multiple position sensors may be used to determine a position of the electric motor (105).

The vehicle of FIG. 1 further includes an electronic control unit (ECU) (109) that is configured to control various components and systems within a vehicle. In a particular embodiment, the ECU (109) is configured to control one or more vehicle subsystems. Commonly referred to as the vehicle's "computers", an ECU may be a vehicle subsystem control units, such as an Engine Control Module (ECM), a Powertrain Control Module (PCM), a Transmission Control Module (TCM), a Brake Control Module (BCM), a Central Timing Module (CTM), a General Electronic Module (GEM), a Suspension Control Module (SCM). In a particular embodiment, the ECU may be considered a Vehicle Control Unit (VCU) that controls one or more other ECUs. The ECU (109) is in communication with the electric motor (105) and is configured to control operation of the electric motor (105) in response to one or more sensor inputs. The ECU (109) is further configured to receive the output signal representative of the rotational position of the electric motor (105) from the position sensor (107) and control operation of the electric motor (105) based upon the output signal. The ECU (109) is further configured to determine an estimated error of the output signal and further control operations of the electric motor (105), such as entering a safe mode, based on the estimated error as further described herein with respect to one or more embodiments.

The arrangement of devices making up the exemplary system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), Bluetooth protocol, Near Field Communication, Controller Area Network (CAN) protocol, and others as will occur to those of skill in the art. Various embodiments of the present disclosure may be implemented on a variety of hardware platforms in addition to those illustrated in FIG. 1.

Figure 2:
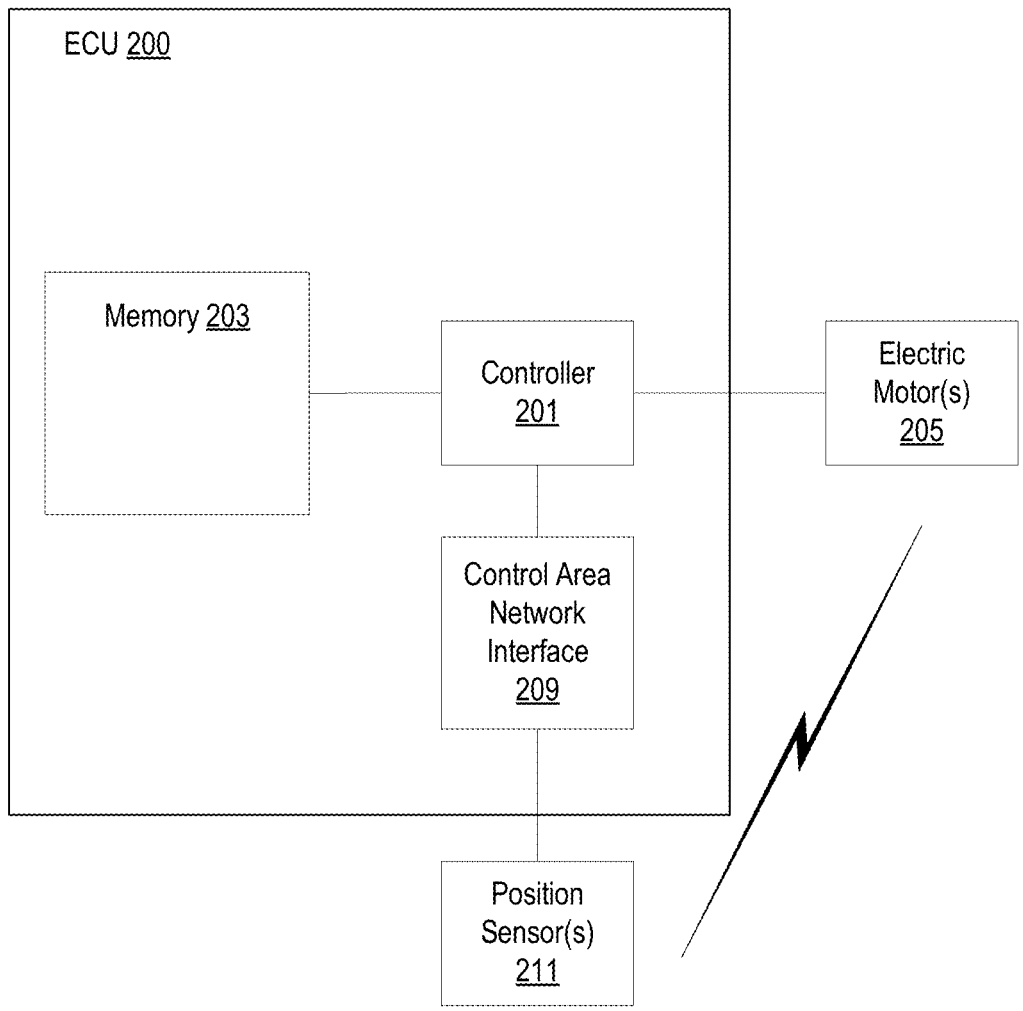
FIG. 2 sets forth a diagram of an exemplary vehicle electronic control unit (ECU) for error estimation in E-motor sensors according to embodiments of the present disclosure.

For further explanation, FIG. 2 sets forth a diagram of an exemplary vehicle electronic control unit (ECU) (200) for error estimation in E-motor sensors according to embodiments of the present disclosure. The ECU (200) includes a controller (201) coupled to a memory (203). The controller (201) is configured to obtain sensor readings related to vehicle operating conditions, as well as data from sources external to the vehicle, and provide control signals to one or more electric motors (205), such as the electric motor (105) of FIG. 1. The controller (201) may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The sensor readings and data may be stored in the memory (203). The memory (203) may be a non-volatile memory such as flash memory. For example, the ECU (200) may obtain vehicle operating condition data such as sensor readings from sensors on-board the vehicle.

The ECU (200) may further comprise a controller area network (CAN) interface (209) for communicatively coupling vehicle sensors and devices to the controller (201). The CAN interface (209) couples one or more position sensor(s) (211) to the controller (201). The position sensor(s) (211) measure the rotational position of the electric motor(s) (205) during operation of the electric motor(s) (205).

The controller (201) is configured to receive position data from the position sensors 211, and the controller (201) may be configured to calculate an estimated error offset during a calibration operation of the electric motor(s) (205) based upon the position data. The controller (201) may be further configured to store the estimated error offset in the memory (203). In some embodiments, the estimated error offset provides for a system level error offset compensation for the position sensor(s) (211) during normal operation of the electric motor(s) (205). In some embodiments, the controller (201) may be configured to receive position data from the position sensor(s) (211) during normal operation of the electric motor(s) (205) and calculate an estimated error of the position signals. In some embodiments, the controller (201) may be configured to compare the estimated error to the stored estimated error offset and perform a specific action if a difference between the estimated error and the stored estimated error offset is greater than a predetermined threshold. For example, the controller (201) may be configured to enter the electric motor(s) (205) into a safe mode state or take other appropriate action, such as providing a warning indication, if the difference between the estimated error and the stored estimated error offset is greater than the predetermined threshold. In another example, the system level offset compensation provided by the estimated error offset allows accurate detection of hardware failure errors in the position sensor(s) (211).

In a particular embodiment, the memory (203) includes computer program instructions that when executed by the controller (201) cause the controller (201) to carry out the operations of calculating the estimated error offset; calculating the estimated error; comparing the estimated error to the estimated error offset; and performing an action based on the comparison.

Figure 3:
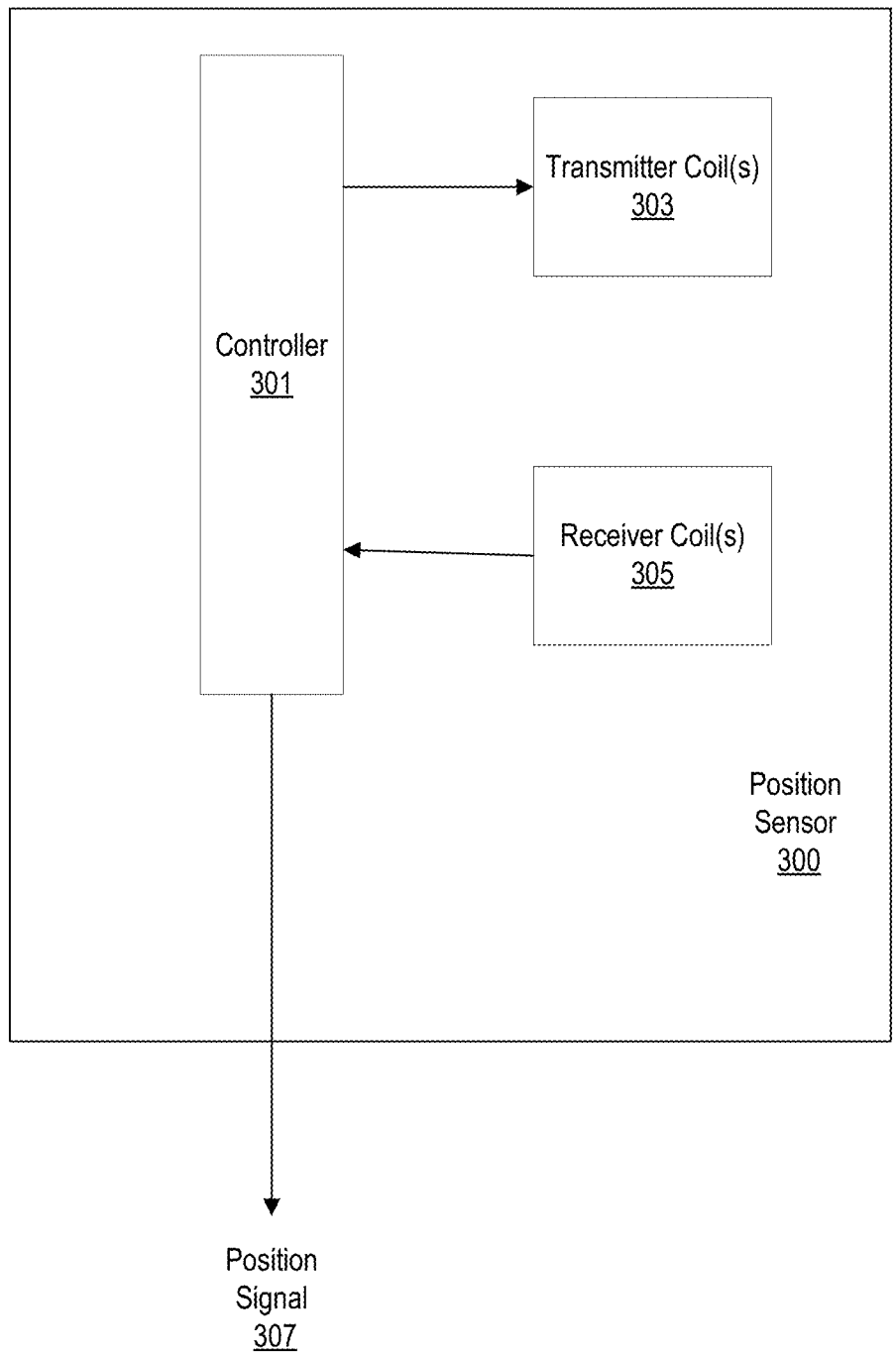
FIG. 3 sets forth a diagram of an exemplary position sensor configured for measuring position of an electric motor according to embodiments of the present disclosure.

For further explanation, FIG. 3 sets forth a diagram of an exemplary position sensor (300) configured for measuring position of an electric motor according to embodiments of the present disclosure. The position sensor (300) includes a controller (301). The controller (301) may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. In the particular embodiment illustrated in FIG. 3, the position sensor (300) is an inductive position sensor.

The position sensor (300) of FIG. 3 also includes one or more transmitter coils (303) and one or more receiver coils (305) coupled to the controller (301). The controller (301) drives the transmitter coils (303) to generate a time-varying magnetic field that induces eddy currents in a conductive target positioned relative to the transmitter coils (303) and the receiver coils (305). In a particular embodiment, the conductive target is attached to a rotor of the electric motor. The receiver coils (305) provide a signal related to the superposition of the magnetic fields generated by the transmitter coils (303) and the eddy currents induced in the conductive target positioned near the receiver coils (305) to the controller (301). In a particular embodiment, the receiver coils (305) include a sine coil that generates a sine signal and a cosine coil that generated a cosine signal as the target is rotated over the receiver coils (305). The controller (301) is further configured to output a position signal (307) indicative of the position of the electric motor. In a particular embodiment, the position signal (307) is an orthogonal signal that includes the sine signal and the cosine signal output by the receiver coils (305). The sine signal and the cosine signal provide position information that can be used to obtain a position of the rotor of the electric motor as well as estimate an error associated with the position sensor (300).

Readers will appreciate that existing methods of estimating sensor error based on magnitude evaluation of an orthogonal output signal (i.e., a sine output signal and a cosine output signal) from a position sensor are effective only under nominal mechanical tolerance conditions. An example procedure for calculating an estimated error from an orthogonal output signal from a position sensor is as follows:

A magnitude $M(t_k)$ of the orthogonal output signal at a sample time $t_k$ over a range of time samples 0 ... N is calculated according to the following formula:

$$M(t_k) = \sqrt{\Delta \sin(t_k)^2 + \Delta \cos(t_k)^2} \quad (1)$$

where $\Delta \sin(t_k)$ is the value of the sine output signal at sample time $t_k$ and $\Delta \cos(t_k)$ is the value of the cosine output signal at sample time $t_k$.

A minimum and maximum value of the magnitude is identified according to the following formulas:

$$M_{max} = \max(M(t_n)_{n=0}^N) \quad (2)$$

$$M_{min} = \min(M(t_n)_{n=0}^N) \quad (3)$$

A magnitude ripple value M_Ripple is calculated as:

$$M_{Ripple} = \frac{M_{max} - M_{min}}{M_{max} + M_{min}} \quad (4)$$

M_Ripple is representative of a percentage value of the magnitude variation. An absolute angle error in degrees is estimated according to the following formula:

$$\alpha_{error} = M_{Ripple} * \frac{360}{\pi} \quad (5)$$

Runout refers to the inaccuracy in a rotating mechanism where the rotation does not occur around the main axis. Radial runout is when the axis of rotation is off-center from the main axis, but still parallel to the main axis. Axial runout is when the axis of rotation is tilted to some degree from the main axis, meaning the axis of rotation is no longer parallel to the main axis. The estimated error matches the actual error when axial and radial runout between the position sensor and the target is close to zero. However, when there is a significant radial and/or axial runout between the target affixed to the rotor of the electric motor and the position sensor, the error difference between the estimated error and the actual error is significantly high as shown in FIG. 4 and FIG. 5.

Figure 4:
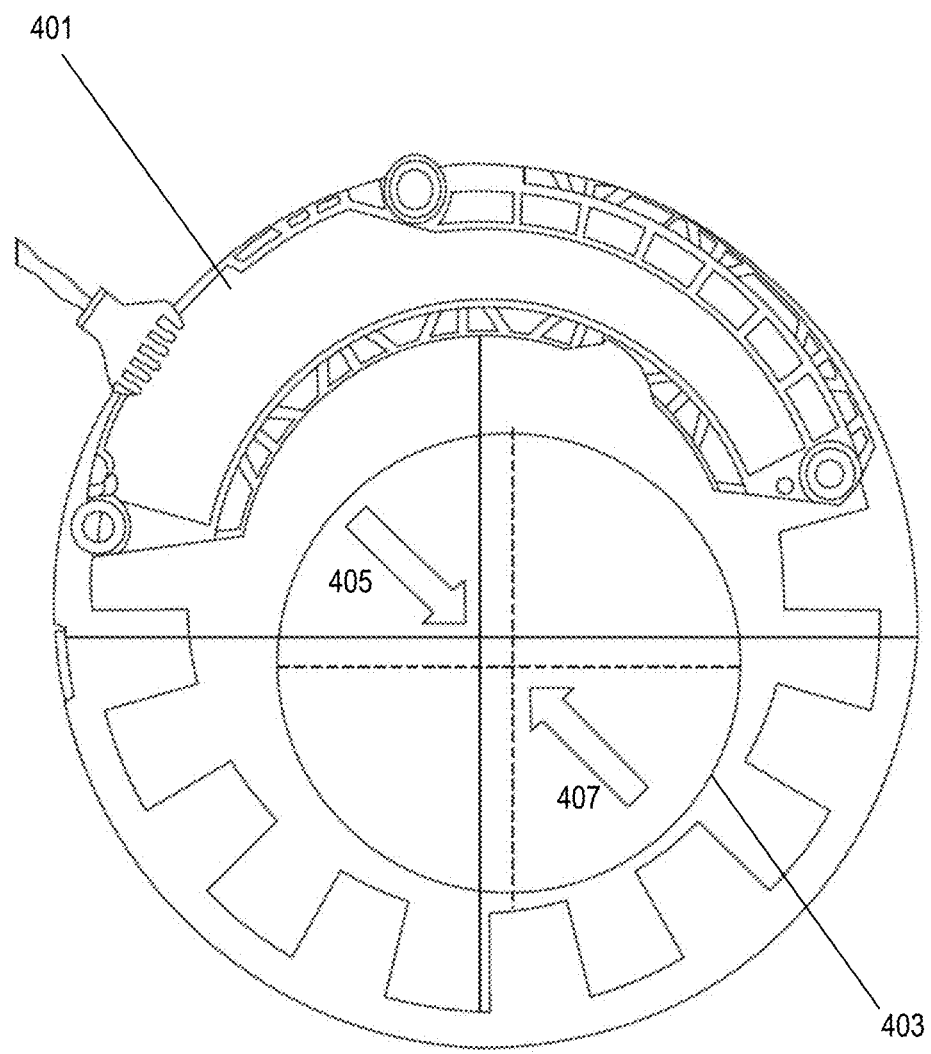
FIG. 4 illustrates an example of radial runout between a position sensor and a target affixed to a rotor of an electric motor.

FIG. 4 illustrates an example of radial runout between a position sensor (401) and a target affixed to a rotor of an electric motor (403). As illustrated in FIG. 4, significant misalignment between an axis of rotation (405) of the position sensor (401) and an axis of rotation (407) of the rotor of the electric motor (403).

Figure 5:
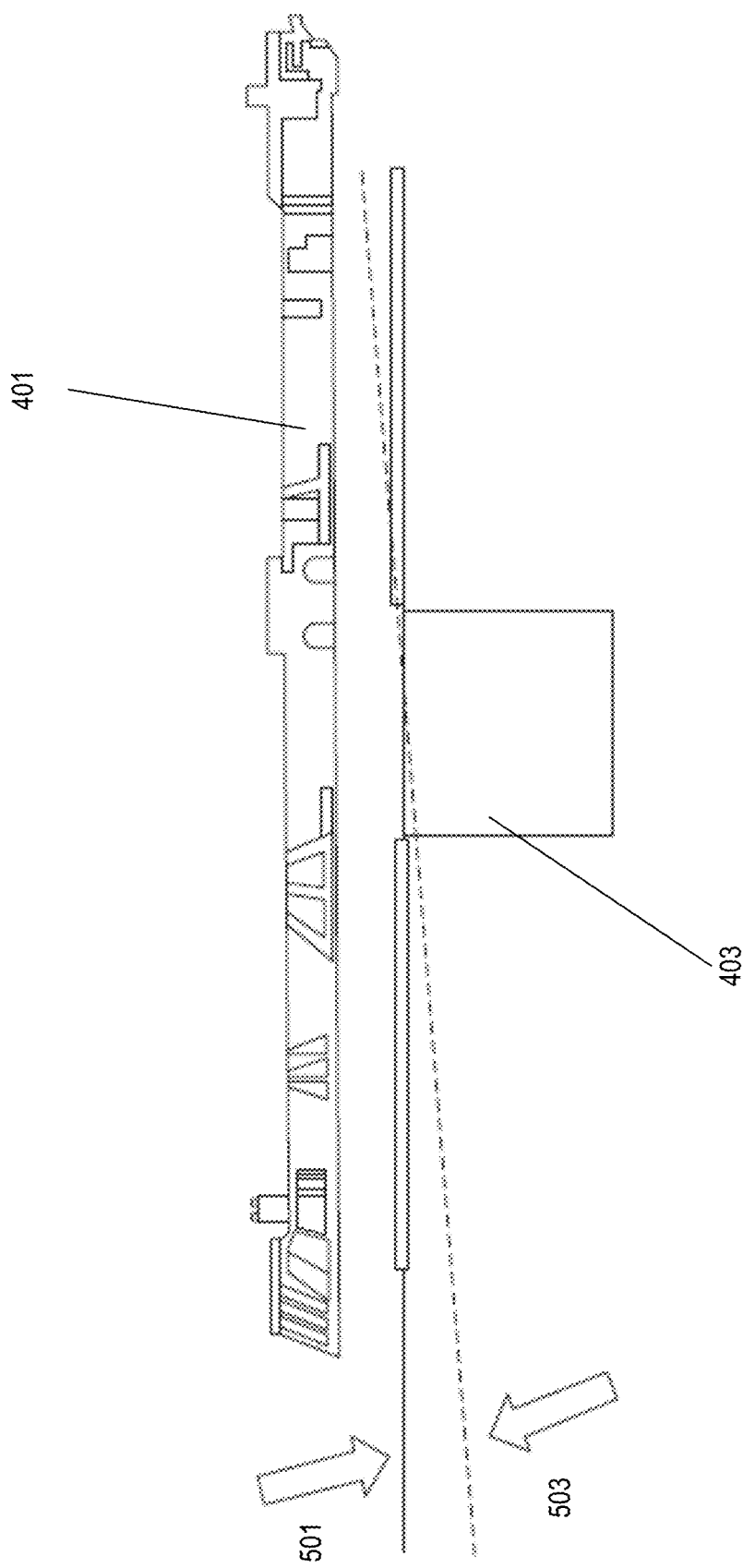
FIG. 5 illustrates an example of axial runout between the position sensor and the target affixed to the rotor of the electric motor.

FIG. 5 illustrates an example of axial runout between the position sensor (401) and the target affixed to the rotor of the electric motor (403). As illustrated in FIG. 4, the plane of rotation (501) of the position sensor (401) and a plane of rotation of the rotor of the electric motor (403) are not perpendicular to one another.

Figure 6:
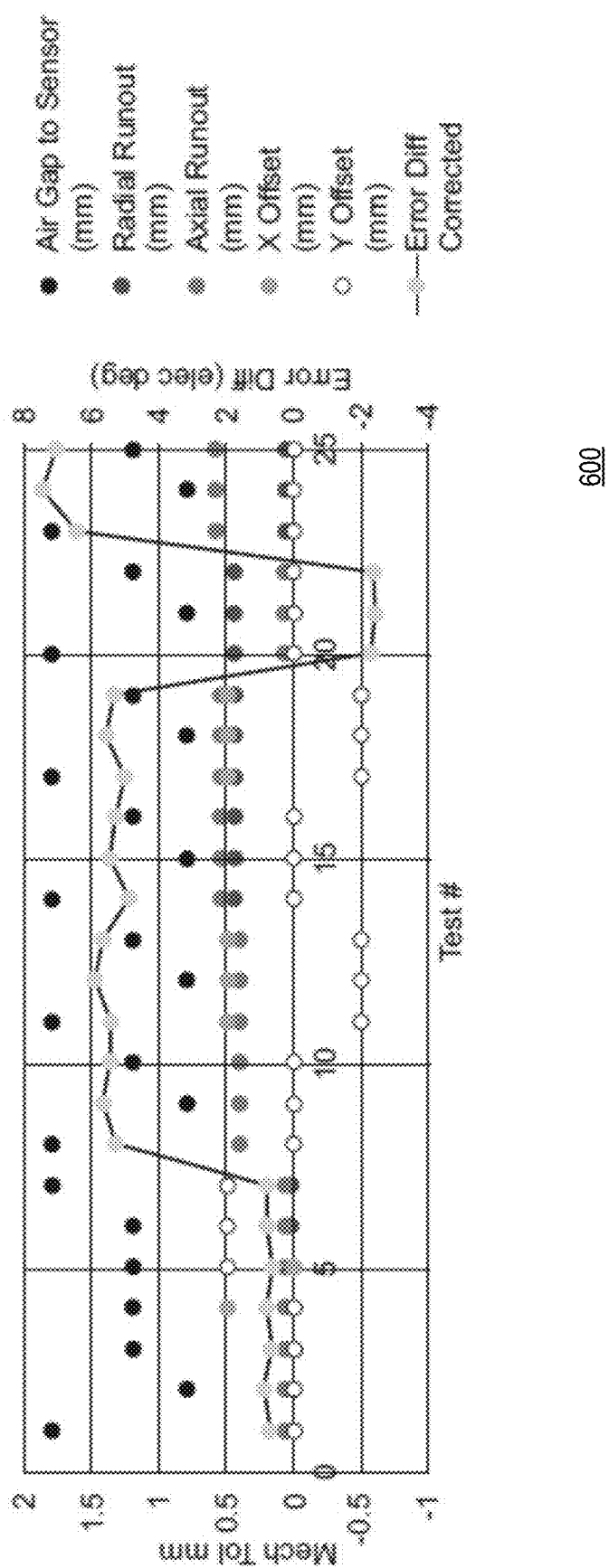
FIG. 6 illustrates an example plot of error difference between estimated error and actual error as a result of variations in radial runout and axial runout between the position sensor and a target affixed to the rotor of the electric motor.

FIG. 6 illustrates an example plot (600) of error difference between estimated error and actual error as a result of variations in radial runout and axial runout between the position sensor (401) and the target affixed to the rotor of the electric motor (403). As shown in FIG. 6, the error difference is close to zero during low axial and radial runout conditions. However, with high axial and radial runout conditions, the error difference is significantly higher. Existing methods of calculating estimated position sensor error are often not suitable for such conditions.

Accordingly, a need exists for accurate error estimation of position sensors in the presence of high target runout conditions. Various embodiments described herein provide for an approach to estimating error in electric motor position sensors even in the presence of high runout conditions. One or more embodiments provide for accurate error estimation in electric motor position sensors in order to detect hardware failures in sensors or systems for functional safety diagnostic requirements. One or more embodiments provide for the removal of fixed system level error in order to estimate hardware failures with a higher degree of accuracy, even in the presence of high target runout conditions.

In some implementations, the ECU (109) of FIG. 1 receives a position signal from the position sensor (107) during a calibration operation of the electric motor (105). The position signal is indicative of a rotational position of the electric motor (105). In a particular embodiment, the position signal is an orthogonal output signal that includes a sine signal component and a cosine signal component. An embodiment of a procedure for calculating an estimated error from the orthogonal output signal during a calibration procedure is as follows:

The magnitude $M(t_k)$ of the orthogonal output signal at a sample time $t_k$ over the range of time samples 0 ... N is calculated according to the following formula:

$$M(t_k) = \Delta \sin(t_k)^2 + \Delta \cos(t_k)^2 \quad (6)$$

where $\Delta \sin(t_k)$ is the value of the sine output signal at sample time $t_k$ and $\Delta \cos(t_k)$ is the value of the cosine output signal at sample time $t_k$.

The minimum and maximum value of the magnitude is identified according to the following formulas:

$$M_{max} = \max(M(t_n)_{n=0}^{N}) \quad (7)$$

$$M_{min} = \min(M(t_n)_{n=0}^{N}) \quad (8)$$

A magnitude ripple value M_Ripple is calculated as:

$$M_{Ripple} = \frac{M_{max} - M_{min}}{M_{max} + M_{min}} \quad (9)$$

M_Ripple is representative of a percentage value of the magnitude variation. An absolute angle error in degrees calculated at motor calibration is estimated according to the following formula:

$$\alpha_{error}(\text{calculated at motor calibration}) = M_{Ripple} * \frac{360}{\pi} \quad (10)$$

As disclosed herein in a particular embodiment, an estimated error offset EST_Error_Offset, is calculated at the vehicle level end-of-line motor calibration by setting the estimated error offset equal to the absolute angle error in degrees calculated at motor calibration as follows:

$$\text{EST\_Error\_Offset} = \alpha_{error}(\text{calculated at motor calibration}) \quad (11)$$

In a particular embodiment, the estimated error offset EST_Error_Offset is stored by the ECU (109) in a memory such as memory (203) of FIG. 2.

After the calibration procedure, during normal operation of the electric motor (105), the ECU (109) of FIG. 1 continuously or periodically receives the position signal from the position sensor (107) and calculates the magnitude $M(t_k)$ of the orthogonal signal, the minimum and maximum value of the magnitude ($M_{max}$, $M_{min}$), and the magnitude ripple value M_Ripple of the continuous position signal according to equations (6)-(9) as disclosed above.

An absolute angle error in degrees calculated continuously, $\alpha_{error}$ (calculated continuously) is estimated according to equation (10) described above.

An estimated error, EST_Error, is calculated continuously as follows:

$$\text{EST\_Error} = \alpha_{error}(\text{calculated continuously}) \quad (12)$$

In one or more embodiments, the estimated error (EST_Error) is compared by the ECU (109) to the stored estimated error offset (EST_Error_Offset), and if the difference is greater than a predefined or predetermined threshold, the ECU (109) takes an appropriate action such as entering a safe mode state of operation.

Figure 7:
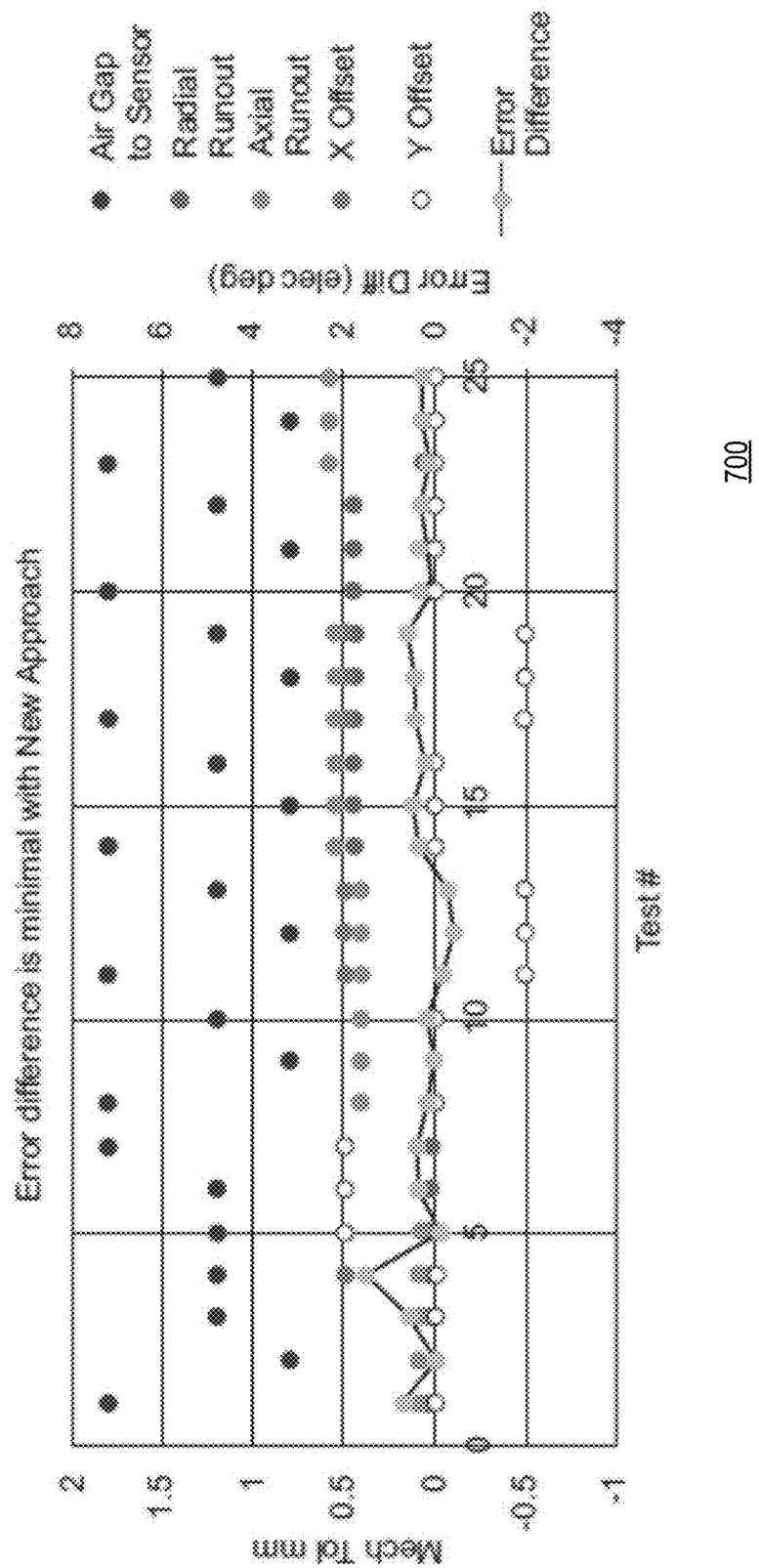
FIG. 7 illustrates an example plot of error difference between estimated error and actual error as a result of variations in radial runout and axial runout between the position sensor and the target affixed to the rotor of the electric motor using an error estimation procedure as described with respect to various embodiments.

FIG. 7 illustrates an example plot (700) of error difference between estimated error and actual error as a result of variations in radial runout and axial runout between the position sensor (401) and the target affixed to the rotor of the electric motor (403) using an error estimation procedure as described with respect to various embodiments. Readers will appreciate that the error difference between the estimated error and the actual error is greatly reduced. As a result, a minimal error difference between estimated error and actual error of the position sensor (401) is achieved according to various embodiments described herein.

Figure 8:
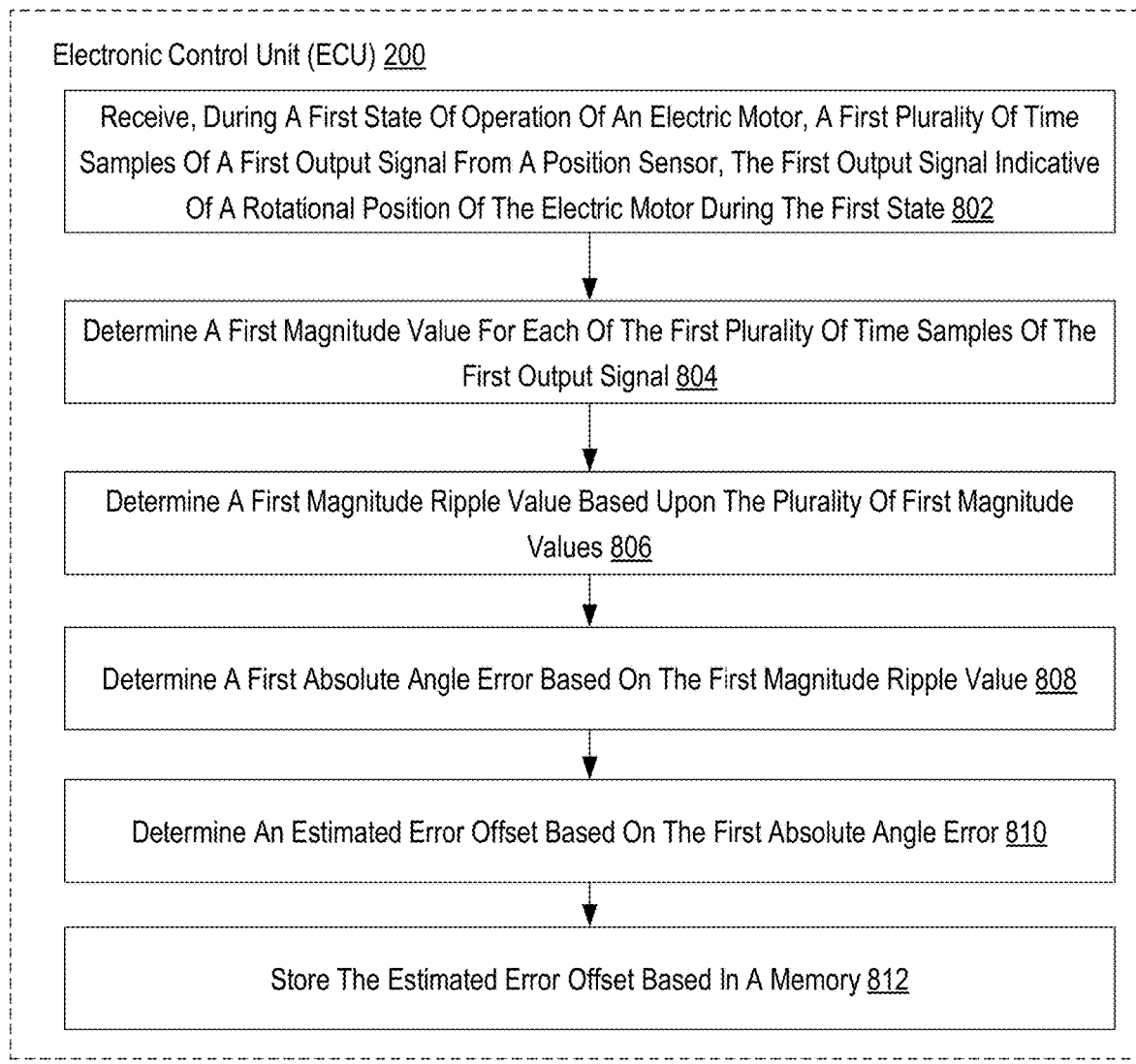
FIG. 8 sets forth a flowchart of an example method for estimating error in an electric motor position sensor in accordance with at least one embodiment of the present disclosure.

For further explanation, FIG. 8 sets forth a flowchart of an example method for estimating error in an electric motor position sensor in accordance with at least one embodiment of the present disclosure. The method of FIG. 8 includes receiving (802), by an electronic control unit (ECU) for an electric motor during a first state of operation of the electric motor, a first plurality of time samples of a first output signal from a position sensor. In a particular embodiment, the first state of operation of the electric motor includes a calibration mode of the electric motor such as during a vehicle level end-of-line motor calibration procedure. In an embodiment, the first output signal is indicative of a rotational position of the electric motor during the first state. In a particular embodiment, the position sensor comprises an inductive position sensor. In another particular embodiment, the electric motor is a synchronous electric motor. In still another particular embodiment, the ECU, electric motor, and position sensor are associated with a vehicle such as an automobile.

The method further includes determining (804), by the ECU, a first magnitude value for each of the first plurality of time samples of the first output signal. In a particular embodiment, the first output signal comprises an orthogonal output signal having a sine signal component and a cosine signal component. In a particular embodiment, the first magnitude value is calculated according to equation (6) described above.

The method further includes determining (806), by the ECU, a first magnitude ripple value based upon the plurality of first magnitude values. In a particular embodiment, determining the first magnitude ripple value includes determining, by the ECU, a maximum value and a minimum value from among the plurality of first magnitude values, and determining, by the ECU, the first magnitude ripple value based on the maximum value and the minimum value. In a particular embodiment, the maximum value and the minimum value of the first magnitude values are calculated according to equations (7)-(8) described above. In a particular embodiment, the first magnitude ripple value is calculated according to equation (9) described above.

The method further includes determining (808), by the ECU, a first absolute angle error based on the first magnitude ripple value. In a particular embodiment, the first absolute angle error is calculated according to equation (10) described above. The method further includes determining (810), by the ECU, an estimated error offset based on the first absolute angle error. In a particular embodiment, the estimated error offset is set equal to the first absolute angle error according to equation (11) described above. The method further includes storing (812), by the ECU, the estimated error offset in a memory associated with the ECU. In a particular embodiment, the estimated error offset is stored as a calibration value for system level error offset compensation.

Figure 9B:
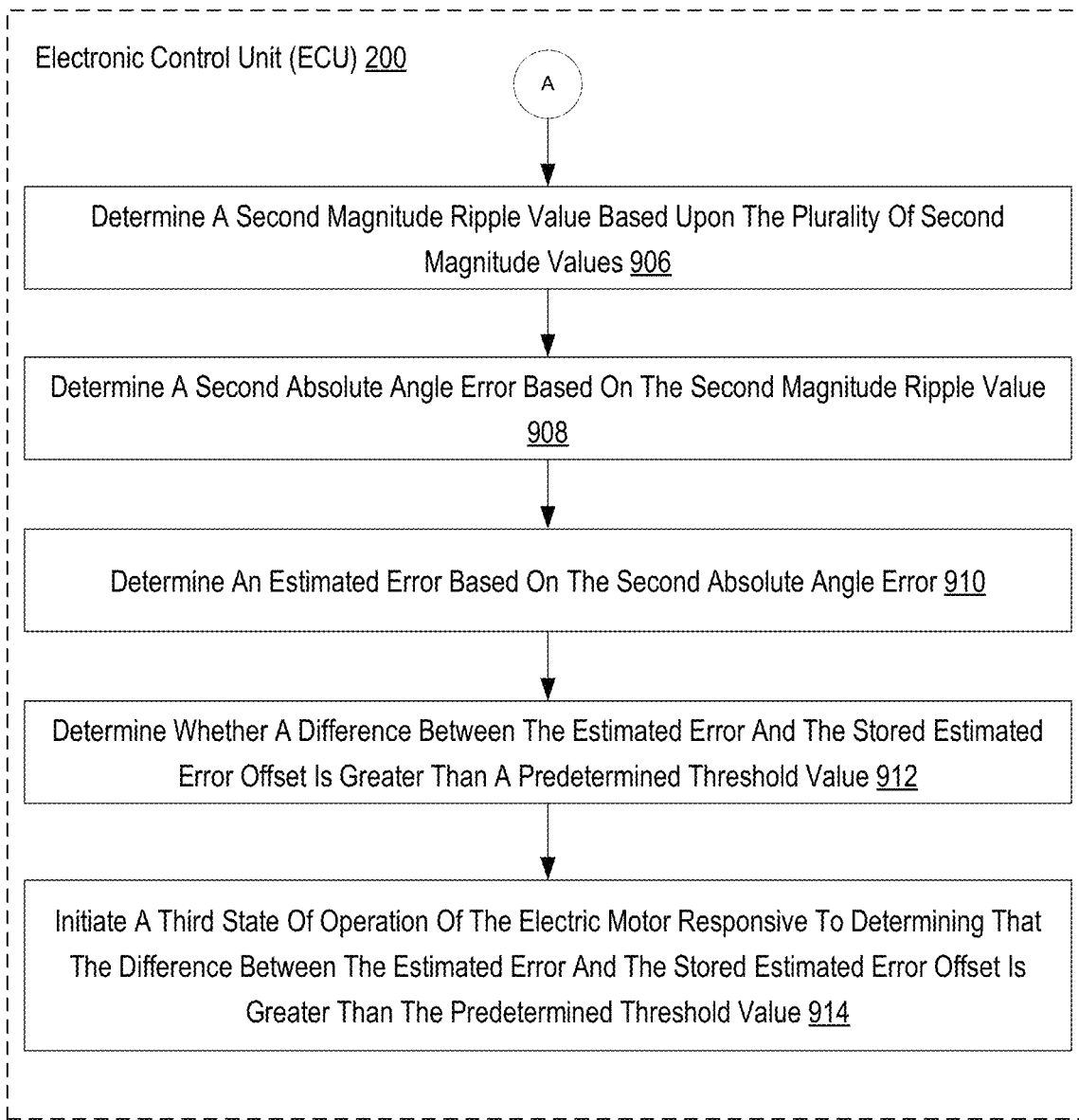

For further explanation, FIGS. 9A-9B set forth a flowchart of an example method for estimating error in an electric motor position sensor in accordance with at least one embodiment of the present disclosure. The method of FIGS. 9A-9B includes elements of FIG. 8. In addition, the method of FIGS. 9A-9B also includes receiving (902), by the ECU during a second state of operation of the electric motor, a second plurality of time samples of a second output signal from the position sensor, the second output signal indicative of a rotational position of the electric motor during the second state. In a particular embodiment, the second state of operation of the electric motor includes a normal operation mode of the electric motor.

The method also includes determining (904), by the ECU, a second magnitude value for each of the second plurality of time samples of the second output signal. In a particular embodiment, the second magnitude value is determined according to equation (6) as described above. The method also includes determining (906), by the ECU, a second magnitude ripple value based upon the plurality of second magnitude values. In a particular embodiment, the second magnitude ripple value is determined based on equations (7)-(9) as discussed above.

The method also includes determining (908), by the ECU, a second absolute angle error based on the second magnitude ripple value. In a particular embodiment, the second absolute angle error is determined based on equation (10) as discussed above. The method also includes determining (910), by the ECU, an estimated error based on the second absolute angle error. In a particular embodiment, the estimated error is set equal to the second absolute angle error according to equation (11) discussed above.

The method also includes determining (912) whether a difference between the estimated error and the stored estimated error offset is greater than a predetermined threshold value. The method may also include initiating (914), by the ECU, a third state of operation of the electric motor responsive to determining that the difference between the estimated error and the stored estimated error offset is greater than the predetermined threshold value. In a particular embodiment, the third state of operation of the electric motor includes a safe mode of operation of the electric motor. For example, the safe mode of operation of the electric motor may include turning off the electric motor or operating the electric motor at a lower level of output power.

In another embodiment, the method may include predicting, by the ECU, a hardware failure associated with the electric motor responsive to determining that the difference between the estimated error and the stored estimated error offset is greater than the predetermined threshold value.

In view of the explanations set forth above, readers will recognize that the benefits of estimating error in an electric motor position sensor according to embodiments of the present disclosure include, but are not limited to:

- Providing for accurate error estimation in electric motor position sensors in order to detect hardware failures in sensors or systems for functional safety diagnostic requirements.
- Providing for the removal of fixed system level error in order to estimate hardware failures with a higher degree of accuracy, even in the presence of high target runout conditions.

Exemplary embodiments of the present invention are described largely in the context of a fully functional computer system for error estimation for electric motor position sensors. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable apparatuses or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Advantages and features of the present disclosure can be further described by the following statements:

1. A method, system, apparatus, and computer program product for estimating error in an electric motor position sensor including receiving, by an electronic control unit (ECU) for an electric motor during a first state of operation of the electric motor, a first plurality of time samples of a first output signal from a position sensor, the first output signal indicative of a rotational position of the electric motor during the first state; determining, by the ECU, a first magnitude value for each of the first plurality of time samples of the first output signal; determining, by the ECU, a first magnitude ripple value based upon the plurality of first magnitude values; determining, by the ECU, a first absolute angle error based on the first magnitude ripple value; determining, by the ECU, an estimated error offset based on the first absolute angle error; and storing the estimated error offset in a memory associated with the ECU.

2. The method, system, apparatus, and computer program product of statement 1 wherein the first state of operation of the electric motor includes a calibration mode of the electric motor.

3. The method, system, apparatus, and computer program product of statements 1 or 2, further comprising computer program instructions that when executed by the computer processor cause the apparatus to carry out the operations of: receiving, by the ECU during a second state of operation of the electric motor, a second plurality of time samples of a second output signal from the position sensor, the second output signal indicative of a rotational position of the electric motor during the second state; determining, by the ECU, a second magnitude value for each of the second plurality of time samples of the second output signal; determining, by the ECU, a second magnitude ripple value based upon the plurality of second magnitude values; determining, by the ECU, a second absolute angle error based on the second magnitude ripple value; determining, by the ECU, an estimated error based on the second absolute angle error; and determining whether a difference between the estimated error and the stored estimated error offset is greater than a predetermined threshold value.

4. The method, system, apparatus, and computer program product of statement 3, wherein the second state of operation of the electric motor includes a normal operation mode of the electric motor.

5. The method, system, apparatus, and computer program product of statement 3, further comprising computer program instructions that when executed by the computer processor cause the apparatus to carry out the operations of: initiating, by the ECU, a third state of operation of the electric motor responsive to determining that the difference between the estimated error and the stored estimated error offset is greater than the predetermined threshold value.

6. The method, system, apparatus, and computer program product of statement 5, wherein the third state of operation of the electric motor includes a safe mode of operation of the electric motor.

7. The method, system, apparatus, and computer program product of any of statements 3-6 further comprising computer program instructions that when executed by the computer processor cause the apparatus to carry out the operations of: predicting, by the ECU, a hardware failure associated with the electric motor responsive to determining that the difference between the estimated error and the stored estimated error offset is greater than the predetermined threshold value.

8. The method, system, apparatus, and computer program product of any of statements 1-7 wherein determining the first magnitude ripple value includes: determining, by the ECU, a maximum value and a minimum value from among the plurality of first magnitude values; and determining, by the ECU, the first magnitude ripple value based on the maximum value and the minimum value.

9. The method, system, apparatus, and computer program product of any of statements 1-8, wherein the first output signal comprises a first orthogonal output signal.

10. A method, system, apparatus, and computer program product of statement 9, wherein the first orthogonal output signal comprises a sine signal component and a cosine signal component.

11. The method, system, apparatus, and computer program product of any of statements 1-10, wherein the position sensor comprises an inductive position sensor.

12. The method, system, apparatus, and computer program product of any of statements 1-11, wherein the electric motor is a synchronous electric motor.

13. A method, system, apparatus, and computer program product combined with any of statements 1-12, wherein the ECU, electric motor, and position sensor are associated with a vehicle.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

The invention claimed is:

1. An apparatus for estimating error in an electric motor position sensor, the apparatus including a computer processor coupled to a computer readable storage medium, the computer readable storage medium including computer program instructions that when executed by the computer processor cause the apparatus to carry out the operations of:
   receiving, by an electronic control unit (ECU) for an electric motor during a first state of operation of the electric motor, a first plurality of time samples of a first output signal from a position sensor, the first output signal indicative of a rotational position of the electric motor during the first state;
   determining, by the ECU, an estimated error offset for the first plurality of time samples;
   storing, by the ECU, the estimated error offset in a memory associated with the ECU;
   receiving, by the ECU during a second state of operation of the electric motor, a second plurality of time samples of a second output signal from the position sensor, the second output signal indicative of a rotational position of the electric motor during the second state; wherein the second state of operation is different than the first state of operation;
   determining, by the ECU, an estimated error for the second plurality of time samples; and
   determining, by the ECU, whether a difference between the estimated error and the stored estimated error offset is greater than a predetermined threshold value.

2. The apparatus of claim 1 wherein the first state of operation of the electric motor includes a calibration mode of the electric motor.

3. The apparatus of claim 1 wherein the second state of operation of the electric motor includes a normal operation mode of the electric motor.

4. The apparatus of claim 1 further comprising computer program instructions that when executed by the computer processor cause the apparatus to carry out the operations of:
   initiating, by the ECU, a third state of operation of the electric motor responsive to determining that the difference between the estimated error and the stored estimated error offset is greater than the predetermined threshold value.

5. The apparatus of claim 4 wherein the third state of operation of the electric motor includes a safe mode of operation of the electric motor.

6. The apparatus of claim 1 further comprising computer program instructions that when executed by the computer processor cause the apparatus to carry out the operations of:
   predicting, by the ECU, a hardware failure associated with the electric motor responsive to determining that the difference between the estimated error and the stored estimated error offset is greater than the predetermined threshold value.

7. The apparatus of claim 1 wherein determining, by the ECU, an estimated error offset for the first plurality of time samples includes:
   determining, by the ECU, a maximum value and a minimum value from among a plurality of first magnitude values; and
   determining, by the ECU, a first magnitude ripple value based on the maximum value and the minimum value.

8. The apparatus of claim 1 wherein the first output signal comprises a first orthogonal output signal.

9. The apparatus of claim 8 wherein the first orthogonal output signal comprises a sine signal component and a cosine signal component.

10. The apparatus of claim 1 wherein the position sensor comprises an inductive position sensor.

11. The apparatus of claim 1 wherein the electric motor is a synchronous electric motor.

12. The apparatus of claim 1 wherein the ECU, the electric motor, and the position sensor are associated with a vehicle.

13. A method for estimating error in an electric motor position sensor, comprising:
receiving, by an electronic control unit (ECU) for an electric motor during a first state of operation of the electric motor, a first plurality of time samples of a first output signal from a position sensor, the first output signal indicative of a rotational position of the electric motor during the first state;
determining, by the ECU, an estimated error offset for the first plurality of time samples;
storing, by the ECU, the estimated error offset in a memory associated with the ECU;
receiving, by the ECU during a second state of operation of the electric motor, a second plurality of time samples of a second output signal from the position sensor, the second output signal indicative of a rotational position of the electric motor during the second state; wherein the second state of operation is different than the first state of operation;
determining, by the ECU, an estimated error for the second plurality of time samples; and
determining, by the ECU, whether a difference between the estimated error and the stored estimated error offset is greater than a predetermined threshold value.

14. The method of claim 13, further comprising:
initiating, by the ECU, a third state of operation of the electric motor responsive to determining that the difference between the estimated error and the stored estimated error offset is greater than the predetermined threshold value.

15. The method of claim 13, further comprising:
predicting, by the ECU, a hardware failure associated with the electric motor responsive to determining that the difference between the estimated error and the stored estimated error offset is greater than the predetermined threshold value.

16. A non-transitory computer program product storing instructions, that when executed by at least one processor, cause the at least one processor to:
receive, by an electronic control unit (ECU) for an electric motor during a first state of operation of the electric motor, a first plurality of time samples of a first output signal from a position sensor, the first output signal indicative of a rotational position of the electric motor during the first state;
determining, by the ECU, an estimated error offset for the first plurality of time samples;
store by the ECU, the estimated error offset in a memory associated with the ECU;
receive, by the ECU during a second state of operation of the electric motor, a second plurality of time samples of a second output signal from the position sensor, the second output signal indicative of a rotational position of the electric motor during the second state; wherein the second state of operation is different than the first state of operation;
determine, by the ECU, an estimated error for the second plurality of time samples; and
determine, by the ECU, whether a difference between the estimated error and the stored estimated error offset is greater than a predetermined threshold value.

17. The non-transitory computer program product of claim 16, wherein the instructions further cause the at least one processor to:
initiate, by the ECU, a third state of operation of the electric motor responsive to determining that the difference between the estimated error and the stored estimated error offset is greater than the predetermined threshold value.

* * * * *